US008083264B2

(12) United States Patent
Iftime et al.

(10) Patent No.: US 8,083,264 B2
(45) Date of Patent: Dec. 27, 2011

(54) DOCUMENT WITH INVISIBLE ENCODED INFORMATION AND METHOD OF MAKING THE SAME

(75) Inventors: Gabriel Iftime, Mississauga (CA); Peter M. Kazmaier, Mississauga (CA); Paul F. Smith, Oakville (CA); Kurt I. Halfyard, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 922 days.

(21) Appl. No.: 12/029,065

(22) Filed: Feb. 11, 2008

(65) Prior Publication Data

US 2009/0200792 A1 Aug. 13, 2009

(51) Int. Cl.
*B42D 15/00* (2006.01)
*G06K 19/06* (2006.01)

(52) U.S. Cl. ............... 283/92; 283/85; 283/91; 235/491

(58) Field of Classification Search .................... 283/85, 283/87, 91, 92; 235/491
See application file for complete search history.

(56) References Cited

U.S. PATENT DOCUMENTS

| | | | | |
|---|---|---|---|---|
| 5,128,525 | A | 7/1992 | Stearns et al. | |
| 5,168,147 | A | 12/1992 | Bloomberg | |
| 5,569,317 | A * | 10/1996 | Sarada et al. | 524/111 |
| 5,807,625 | A | 9/1998 | Amon et al. | |
| 6,905,538 | B2 * | 6/2005 | Auslander | 283/92 |
| 2002/0030112 | A1 * | 3/2002 | Schreiber | 235/494 |
| 2004/0007340 | A1 | 1/2004 | Watson | |
| 2004/0180213 | A1 * | 9/2004 | Harris et al. | 428/423.1 |
| 2004/0233465 | A1 | 11/2004 | Coyle et al. | |
| 2007/0119951 | A1 * | 5/2007 | Auslander et al. | 283/92 |

FOREIGN PATENT DOCUMENTS

| | | |
|---|---|---|
| GB | 1 602 755 | 5/1978 |

OTHER PUBLICATIONS

U.S. Appl. No. 11/683,193, filed Mar. 7, 2007 (Iftime et al.).
U.S. Appl. No. 11/554,652, filed Oct. 31, 2006 (Iftime et al.).
U.S. Appl. No. 11/554,871, filed Oct. 31, 2006 (Iftime et al.).
U.S. Appl. No. 1 1/S37,585, filed Aug. 13, 2007 (Wosnick et al.).
U.S. Appl. No. 11/554,133, filed Oct. 30, 2006 (Iftime el al.).
New U.S. Patent Application, filed Feb. 11, 2008, (Halfyard et al.).
Office Action dated Jul. 9, 2010 in pending U.S. Appl. No. 11/683,193.
Office Action dated Nov. 26, 2010 in pending U.S. Appl. No. 11/683,193.
Notice of Allowance dated Dec. 29, 2010 in pending U.S. Appl. No. 11/683,193.

* cited by examiner

*Primary Examiner* — Dana Ross
*Assistant Examiner* — Kyle Grabowski
(74) *Attorney, Agent, or Firm* — Oliff & Berridge, PLC

(57) ABSTRACT

A document includes a paper substrate having an average surface roughness of at least about 0.5 microns, wherein the paper substrate includes encoded information printed thereon, and wherein the encoded information is printed with an ink comprised of light absorbing material that absorbs light only at wavelengths below 350 nm and an optional clear binder in a solvent. The encoded information is substantially not detectable to a naked human eye through differential gloss or exposure to light having wavelengths of 365 nm or more, and is only revealed upon exposing the document to light having a wavelength at which the light absorbing material absorbs light, which is less than 350 nm.

18 Claims, No Drawings

DOCUMENT WITH INVISIBLE ENCODED INFORMATION AND METHOD OF MAKING THE SAME

BACKGROUND

Described herein are documents and methods of making and using the same, wherein the document contains encoded information that is substantially not detectable to the human eye under normal light or black light. The presence of the encoded information is very difficult to detect by persons not knowing that the encoded information is included in the document. Thus, the encoded information is able to remain secure except to persons aware of its presence, and the document can be very difficult to counterfeit. The encoded information, being substantially invisible under both normal viewing conditions and black light conditions typically used by counterfeiters to detect hidden information in a document, is very difficult to copy. The document is thus advantageously useful in security applications.

An especially difficult task with document security is the creation of documents that contain embedded or hidden information the presence of which is not detectable by the naked human eye. One technique being used is to print the information onto the document with clear (colorless) inks that include materials that interact with UV light, for example by fluorescing, so that the information can become visible to the naked human eye upon exposure to the UV light.

For example, U.S. Patent Publication No. 2004/0233465 describes an article marked with image indicia for authentication, information, or decoration by providing a plurality of inks having a plurality of fluorescent colors when exposed to excitation energy, separating colors of the image indicia into a plurality of image levels in accordance with the fluorescence colors of the inks, and printing each image level in mutual registration on the article using the corresponding ink. The image printed with each ink may be substantially invisible under illumination within the visible spectrum. The invisibly printed images have multiple authentication features, including the use of covert UV-fluorescent materials, IR-fluorophores, microparticles, and other chemical taggants.

U.S. Pat. No. 5,807,625 describes photochromic printing inks that are used for the printing of security documents. Prints are normally nearly colorless and become colored when energy irradiated, such as by ultraviolet light. This photocoloration is reversible. The printing inks contain photochromic compounds which are protected against other ink components. Methods are described to prepare the inks, to print security documents, and to detect counterfeiting.

However, several problems may be encountered with the above techniques. First, the clear ink used to form the hidden information may have a differential gloss from the document substrate, typically paper, and thus the naked human eye could detect that something is present on the document. A counterfeiter could then investigate further to reveal the hidden information. Second, even if no differential gloss were evident, the hidden information may still be revealed with the use of a simple black light, and counterfeiters knowing of the prevalent use of UV absorbing inks often will check a document under black light.

What is still required is a method of embedding encoded information or images into a document such that the information is substantially undetectable to the naked human eye due to differential gloss, and which is further not detectable or revealed by black light.

SUMMARY

The documents, systems and methods described herein are suitable for fulfilling one or more of the above needs. These and other features of the documents, systems and methods, as well as additional inventive features, will be apparent from the following description.

Described is a document comprising a paper substrate having an average surface roughness of at least about 0.5 microns, wherein the paper substrate includes encoded information printed thereon, and wherein the encoded information is printed with an ink comprised of light absorbing material that absorbs light only at wavelengths below 350 nm and an optional clear binder in a solvent. The encoded information may be in any form, such as one-dimensional barcode, two-dimensional barcode, data glyphs, dots and combinations thereof.

Also described is a document security system for forming a document comprised of a paper substrate having an average surface roughness of at least about 0.5 microns, wherein the paper substrate includes encoded information printed thereon, and wherein the encoded information is printed with an ink comprised of clear binder and light absorbing material that absorbs light only at wavelengths below 350 nm, the document security system comprising a printer for printing the ink onto the paper substrate, an encoding device that provides information in encoded form to the printer, a detection device including a source that emits light at a wavelength of less than 350 nm and matched to the wavelength at which the light absorbing material absorbs light and a reader, and a decoding device to decode the encoded information.

Also described is a method of forming a document including encoded information on a paper substrate, wherein the encoded information is substantially not detectable to a naked human eye through differential gloss or exposure to light having wavelengths of 365 nm or more, the method comprising providing a paper substrate having an average surface roughness of at least about 0.5 microns, and printing the encoded information on the paper substrate with an ink comprised of light absorbing material that absorbs light only at wavelengths below 350 nm and an optional clear binder in a solvent.

In embodiments, advantages of the documents and methods described herein include that encoded information may be formed on the paper substrate in a manner substantially not detectable to a naked human eye through differential gloss or exposure to light having wavelengths of 365 nm or more, and thus not detectable under most common conditions used by counterfeiters, but which information can be exposed to a reader, used by one aware of the encoded information being present in the document, through exposure of the document to light having a wavelength at which the light absorbing material absorbs the light.

EMBODIMENTS

The documents herein include a paper substrate and encoded information thereon. The encoded information is substantially invisible to a naked human eye under light having wavelengths of 365 nm or more but visible to a naked human eye under light having wavelengths below 350 nm, such as 260 nm or less.

As the paper substrate, any suitable paper substrate may be used. However, in embodiments where it is desired to achieve an image containing the encoded information so as to be substantially not detectable as the result of no gloss differential between the paper substrate and the printed encoded information, paper substrates having a sufficient surface roughness and/or porosity may be selected. For example, papers with sufficient surface roughness and porosity can permit the colorless ink used to form the encoded information to blend and penetrate into the paper such that no gloss differential results.

Surface roughness refers to when the surface of the paper substrate is characterized by microscopic peaks and valleys. The surface roughness of the substrate surface may be measured by observation through a microscope, by optical interferometry, or by measuring the movements of a stylus dragged over the surface. Typical roughness values, which reflect the distances between peaks and valleys of the substrate surface, may range from several microns to tens of microns. For avoiding differential gloss in the hidden information image, a paper substrate having a surface roughness of at least about 0.5 microns, for example from about 1 microns to about 20 microns or from about 2 microns to about 20 microns, may be used. For paper substrates having the aforementioned surface roughness, the paper substrates are typically substantially free of any surface coatings thereon, for example gloss coatings, which may act to reduce the surface roughness and/or reduce the ability of an ink to penetrate into the paper substrate surface.

In addition, the paper substrate may also desirably have a sufficient porosity so as to permit the ink, for example a liquid ink, to penetrate somewhat into the paper substrate. This also appears to assist in the avoidance of differential gloss. The porosity of the substrate may be measured by, for example, air bleed through the substrate, in units of time per volume of air, or by the absorption rate of fluid into the substrate, in units of volume of fluid per unit of time. For avoiding differential gloss in the printed encoded information, a paper substrate having a porosity of about 100 milliliters per minute to about 2,000 milliliters per minute, such as from about 100 milliliters per minute to about 1,500 milliliters per minute or from about 200 milliliters per minute to about 1,500 milliliters per minute, may be used. Typically, uncoated paper has a porosity of from about 500 to about 1,500 milliliters per minute.

Commercially available papers having the above surface roughness and porosity values include, for example, Xerox 4024 and 4200 paper. For example, Xerox 4200 paper has a surface roughness of about 2.5 microns.

The paper may be white paper, or may be colored and have a color other than white. When the paper substrate is white paper, the paper substrate desirably includes an optical brightener.

The purpose of optical brighteners in the paper is typically to remove the yellowish appearance of the raw materials. Optical brighteners increase the brightness of the paper so that a white paper appears even whiter, for example by increasing the intensity of reflected blue light. Optical brighteners typically act to increase whiteness by converting UV light to blue light.

The function of the optical brighteners to emit blue light is utilized in the documents herein. For example, when the document is exposed to light having wavelengths of less than 350 nm, for example less than 300 nm and/or less than 260 nm, the optical brighteners emit light. Where the ink is made to include materials that do not absorb at wavelengths above 350 nm, the appearance of the document is not changed upon exposure to such light. Thus, under black light (365 nm), the document has the same appearance and the encoded hidden information is not displayed. However, when the wavelength of the exposing light is less than 350 nm, and more specifically at the wavelength at which a material of the ink absorbs the light, the material will then block light from reaching the optical brightener, and thus no blue light will be emitted at such locations. As a result, the encoded hidden information will become visible to a naked human eye under these light viewing conditions, and thus viewable to a reader in a detection device such that the encoded information can be read and subsequently decoded. The optical brighteners in the paper are thus used in the hiding and exposing of the encoded hidden information printed on the paper substrate.

As optical brighteners, any optical brighteners, organic or inorganic, that emit blue light upon exposure to a broad range of light wavelengths may be used. For example, the optical brightener may emit light across a range of from about 100 nm to about 800 nm, such as from about 100 nm to about 700 nm or from about 200 nm to about 500 nm. Examples of typical optical brighteners that may be employed include colloidal silicas, titanium dioxide (for example Rutile or Anatase), hydrated alumina (for example Hydrad), barium sulfate (for example K. C. Blanc Fix HD80, calcium carbonate, high brightness clays (for example Engelhard Paper Clays), Dow plastic pigment (for example 722, 788 Dow Chemicals), calcium silicate, insoluble cellulosic materials (for example from Scientific Polymer Products), tetrasulfonated optical brighteners, for example benzenesulfonic acid, 2,2'-(1-2-ethenediyl)bis[5-[[4-bis(2-hydroxyethyl) amino]-6-[(4-sulfophenyl)amino]-1,3,5-triazin-2-yl] amino]- tetrasodium salt (for example from Ciba Specialty Chemicals Corporation), stilbenes, fluorescent agents, and the like. The optical brighteners may be present in the paper substrate in an amount of from about 1 to about 60 percent by weight of the paper substrate.

The ink for printing the encoded information onto the paper substrate is comprised of at least clear binder and light absorbing material that absorbs light only at wavelengths below 350 nm, such as below 260 nm. Of course, the document can, and often does, include other visible images (that is, visible to a naked human eye under normal visible light conditions, for example visible at wavelengths of light of 365 nm or more) printed with conventional inks, so that the document includes both encoded hidden information and viewable images. The encoded information may be included on one or both sides of the paper substrate, and may be provided on the same side as viewable images formed from conventional inks and/or toners, or may be on the opposite, or back, side of the paper substrate from viewable images formed from conventional inks and/or toners.

As the optional clear binder of the ink, any binder material, for example including oligomeric or polymeric materials, may be used so long as the binder does not absorb light having a wavelength of more than 350 nm. Desirably, the binder should not absorb light having a wavelength or more than 300 nm or more than 260 nm. In this way, the binder also will not be detectable under normal or black light conditions. Examples of suitable binders include, for example, polyacrylates or polymethacrylates such as polymethyl methacrylate, polystyrenes, and polyolefins such as polyethylene, which do not absorb at wavelengths higher than 260 nm. Additional suitable binder materials include polycarbonates, polysulfones, polyethersulfones, polyarylsulfones, polyarylethers, polyvinyl derivatives, cellulose derivatives, polyurethanes, polyamides, polyimides, polyesters, silicone resins, epoxy resins and the like. Copolymer materials such as polystyrene-acrylonitrile, polyethylene-acrylate, vinylidenechloride-vinylchloride, vinylacetate-vinylidene chloride, and styrene-alkyd resins are also examples of suitable binder materials. The copolymers may be block, random, or alternating copolymers.

The binder may be comprised of one, two, three or more different binders. When two or more different binders are present, each binder may be present in an equal or unequal amount by weight ranging, for example, from about 5% to 90%, such as from about 30% to about 50%, based on the weight of all binders.

As the light absorbing material that absorbs light only at wavelengths below 350 nm, any absorbing material that absorbs light at wavelengths below 350 nm, and desirably below 300 nm or below 260 nm, may be used. 365 nm represents black light, and thus it is desired that the light absorbing material not absorb light above or near this wavelength of light. The light absorbing material is thus non-fluorescent in the sense that it does not fluoresce upon exposure to black light. The light absorbing material, which may be organic or inorganic, is also desirably colorless so as not to be detectable to a naked human eye under normal light conditions.

Examples of the light absorbing material include organic molecules such as, for example, hydroxybenzophenones, hydroxybenzotriazoles, oxanilides, triazines and hindered amine light stabilizers. An example oxanilide is TINUVIN 312 available from Ciba that absorbs light at wavelengths below 350 nm, but does not absorb at wavelengths higher than 350 nm.

Examples of inorganic light absorbing materials include inorganic nanoparticles. The nanoparticles may have an average particle size of about 300 nm or less, for example of from about 1 nm to about 300 nm or from about 10 nm to about 200 nm. The average size of the nanoparticles may be determined via any suitable technique and device, for example via use of a Malvern Zeta-sizer, a Brookhaven nanosize particle analyzer or similar device. Examples of inorganic nanoparticles include, for example, titanium dioxide, aluminum oxide, silicon dioxide, zinc oxide, combinations thereof and the like. These inorganic materials must be of the nanoparticle size in order for the material to be transparent to the naked human eye. A size above 300 nm makes titania appear white, which is not desirable as there may be a detectable difference in white color between the nanoparticles and the paper substrate.

The nanoparticles may be commercially available, for example from Sigma-Aldrich. Alternatively, synthetic procedures for making nanoparticles have been reported in the literature. For example, titanium dioxide nanoparticles may be obtained by hydrolysis of titanium tetrachloride in aqueous hydrochloric acid solution. Another procedure starts from tetrabutyl titanate that is hydrolyzed in anhydrous ethanol in the presence of hydrochloric acid as a catalyst. Zinc oxide may be obtained starting from zinc chloride powder.

The nanoparticles may need to be functionalized in order to be dispersible in the marking material composition. Suitable functional groups present on the surface of the nanoparticles for compatibility with marking material vehicles may include, for example, long linear or branched alkyl groups, for example from about 1 carbon atom to about 150 carbon atoms in length, such as from about 2 carbon atoms to about 125 carbon atoms or from about 3 carbon atoms to about 100 carbon atoms. Other suitable compatibilizing groups include esters, ethers, amides, diols, and polyols such as diethylene glycol or polyethylene glycol, carbonates and the like. A review on the subject of surface functionalizing inorganic particles may be found in Kohji Yoshinaga, Ch. 12.1, Surface modification of inorganic particles, in Surfactant Science Series (2000), p. 626-646.

The light absorbing material may be included in the marking material in an amount of from, for example, about 0.1% to about 40% by weight, such as from about 1% to about 25% by weight or from about 2% to about 10% by weight, of the marking material.

The image is desirably formed by printing, for example by ink jetting or any other suitable method for applying a marking material to a substrate, the ink comprising the clear binder and the light absorbing material. In embodiments, the clear binder and light absorbing material are in a liquid ink, for example dispersed in a liquid vehicle. As the liquid vehicle of the ink, any suitable vehicle presently known in the art or that may become known in the future may be used. Example liquid vehicles include a liquid with an effective viscosity of, for example, from about 0.5 to about 500 centipoise, such as from about 0.5 to about 20 centipoise. Specific examples include water, alcohols, hexane, toluene, ISOPAR or a polymer such as polyacrylic acid or polyvinyl alcohol. The liquid may be a branched chain aliphatic hydrocarbon. A nonpolar liquid of the ISOPAR series, comprised of isoparaffinic hydrocarbon fractions and manufactured by the Exxon Corporation, may be used. Additional commercially available hydrocarbon liquids that may be used include, for example, the NORPAR series available from Exxon Corporation, the SOLTROL series available from the Phillips Petroleum Company, and the SHELLSOL series available from the Shell Oil Company.

The amount of the liquid employed in the marking material may be, for example, from about 30 to about 99.9%, for example from abut 50 to about 99%, by weight of the total marking material. The total solids of the liquid marking material may be from, for example, about 0.1 to about 70% by weight, such as from about 0.3 to about 50% by weight, of the marking material.

The use of a liquid vehicle and a porous paper substrate as discussed above allows the ink to penetrate into the paper substrate instead of being present as a film or coating on the substrate as when toner or solid inks are used. This assists in avoiding differential gloss, making the image formed from the liquid marking material substantially undetectable to the naked human eye. Moreover, the penetration into the substrate makes it nearly impossible for one to be able to remove the image from the paper substrate without damaging or destroying the substrate.

The liquid marking material may include additional materials besides the optional clear binder, light absorbing material and optional liquid vehicle. However, it is here again desired that any additional components included in the marking material not absorb light at wavelengths greater than 350 nm.

A method of forming the documents having the encoded information on a paper substrate that is substantially not detectable to a naked human eye through differential gloss or exposure to light having wavelengths of 365 nm or more includes providing a paper substrate as discussed above and forming the encoded information on the paper substrate with the ink discussed above. Again, the formation of the image may be done by any suitable marking procedure. Prior to the curing or drying of the ink, which results in substantially complete to complete removal of the liquid vehicle from the paper substrate, the liquid marking material penetrates into the paper substrate.

The system to form and subsequently detect the encoded information includes at least a printing device or printer to form the encoded information on the paper substrate with the ink.

As the printing device, an ink jet device or other similar device for forming images with the ink may be used. Suitable printing methods include ink jet printing processes, including both continuous stream processes and drop on demand processes (including piezoelectric, thermal or bubble jet, or the like), wherein droplets of the ink are jetted in imagewise fashion onto the substrate. In ink jet devices, for example a thermal ink jet device, an acoustic ink jet device, a piezoelectric ink jet device and the like, the ink is typically included in a reservoir connected by any suitable feeding device to the corresponding ejecting channels of an ink jet head.

In the ink jet device, several embodiments are possible. For example, in embodiments, the ink jet device may be made to jet only the ink containing the light absorbing material, with separate ink jet head(s) for providing images on the substrate with conventional marking inks. In other embodiments, the ink jet head may include separate channels for conventional inks and for the ink containing the light absorbing material, thereby permitting simultaneous printing of the image and the encoded information.

In embodiments, the system may include both a xerographic device and an ink jet device. For example, a xerographic device may be used to form an image with conventional toner, with a separate ink jet device containing the light absorbing material. The xerographic device can be used to form a reproduced image, while the ink jet device can print the encoded information onto each document. Desirably, the ink jet device is downstream of the xerographic device in a process direction, so that the encoded information is not overprinted by the xerographic device, although the ink jet device may also be upstream of the xerographic device.

Associated with the printer is an encoding device, which receives the information to be encoded and encodes the information in a suitable machine readable format. The encoded information is sent to the printer for printing onto the paper substrate.

The system may thus include one or more processors, for example to convert information to the encoded information representative of the information, that is, to convert the information to a machine readable code format. A similar processor may be used to decode encoded information detected by a reader, that is, convert the encoded information to its original uncoded information form, to recover the encoded information.

The machine readable code format may be, for example, one dimensional barcode, two dimensional barcode, glyphs, dots, combinations thereof and the like. One dimensional barcodes have a form such as used for UPC codes on products. The two dimensional barcode may be of any suitable type, such as, for example, PDF417 (based on stacked barcodes), 3-DI, Array Tag, Aztec code, Codablock. Code 16K, CP code, Data Matrix, Datastrip code, Maxicode, Minicode, and the like. The encoded information may also be in the form of data glyphs or dots. In dot code, 0s and 1s are represented by the presence or absence of a dot. Dots refer to, for example, any mark of any shape, and includes, for example, circular or rectangular marks.

In embodiments, the code format is a self-clocking glyph code as disclosed in, for example, U.S. Pat. Nos. 5,128,525 and 5,168,147, the disclosures of each of which are totally incorporated herein by reference. In one embodiment, this code comprises printed glyphs which represent 0 and 1 bits in a document encoding scheme. The glyphs are printed at a substantially uniform distance from each other, so that the center of each glyph is a substantially uniform distance from the center of adjacent glyph(s). These marks can be printed at very high densities of, for example, about 3,600 data bits per square inch or higher, and scanned with a 300 pixel per inch scanner. Data is encoded by the shape or the rotational orientation of the mark. Clocking can be taken from the data itself, without synchronization marks external to the data. By placing a mark at each data bit position, it is easier to synchronize the reading process of the data without the use of registration marks. The number of bits that can be represented by each symbol is related to the total number of symbols in the code; when the number of bits to be represented by a symbol is "n", the total number of glyphs possible in the code is $2^n$ distinctive glyphs. For example, in a code wherein two distinct glyphs are possible, such as / and \, each symbol may represent one bit; for example, /=1 and \=0. In a code wherein four distinct glyphs are possible, such as /, —, \, and |, each symbol can represent two bits; for example, /=00, |=01, \=10, and —=11. In a code wherein eight distinct glyphs are possible, each symbol can represent three bits, and the like. Data can be encoded in the shape of the glyphs, the rotation of the glyphs, or in any other desired variation.

In embodiments, the glyphs are elliptical marks, and in a simple code wherein two distinct shapes are possible, the glyphs preferably are elliptical marks rotated from the vertical at either about +45° (for example, "/") or −45° (for example "\"). The use of orthogonally-oriented marks potentially allows for a large degree of discrimination between data bit 1 and data bit 0. The marks may be inclined at about 45°, rather than being horizontal or vertical, because (a) there is less tendency for adjacent marks to touch, and (b) printing and scanning non-uniformities tend to be horizontal (banding) or vertical (photodetector array response variations). In an embodiment, the two glyphs may each be elongated multi-pixel symbols having the same number of adjacent "ON" pixels and differ from each other in their rotation from the vertical. These specific glyphs are readily discernible from each other, even in the presence of significant distortion and image degradation, because they do not tend to degrade into a common shape.

For detection, the document must be exposed to light having a wavelength at which the light absorbing material absorbs, which light is below 350 nm as detailed herein. An authorized holder of the document will know the wavelength of the light for this absorption. A system for detection and reading of the encoded information desirably includes means that emits light only at the specific wavelength at which the light absorbing material absorbs light, thereby becoming visible and readable upon exposure to such wavelength of light. Exposure of the document to the wavelength of light at which the light absorbing material absorbs light will result in the image becoming visible to the naked human eye, and thus also to a scanner or reader. The scanner may take an image of the visible coded information, which image is sent to a processor for decoding. A reader may directly read and decode the encoded information, for example a machine reader. As detailed above, the image becomes visible under the indicated conditions because the light absorbing material will absorb the incoming light, creating a differential between the marking and the paper substrate that renders the image visible. Removal of the document from this light condition will result in the image again becoming substantially undetectable to the naked human eye.

As mentioned above, other visible images may be included on the document. The visible and invisible images may share a same portion of the document, or the invisible image portion may be in a separate portion of the document for easy location by an authenticator. Any ink or toner capable of forming visible images on a paper substrate may be used without limitation. The visible and invisible portions of the document may be formed at the same or different times in the creation of the document.

Advantages of the documents and methods herein thus include that the invisible image formed on the document cannot be viewed at all under normal or black light conditions and that the invisible information is encoded, thus providing several layers of security for the information, that the encoded information image cannot be copied using any presently available equipment or copiers, that the encoded information can be printed anywhere on a paper substrate without altering the appearance of the paper substrate, that the invisible encoded information image cannot be easily removed from the paper substrate, that the encoded information is printed with non-fluorescent inks and thus can be printed on a wider array or paper substrates and not limited to paper substrates free of fluorescent materials, and that the wavelengths at which the light absorbing materials absorb light may be tuned to allow customization of the security features for different customers.

Embodiments will now be further illustrated by way of the following examples.

EXAMPLE

Invisible Ink Preparation

Water-dispersible invisible titania nanoparticles were prepared by adapting a synthetic method (described in WO 2006/048030, incorporated herein by reference). Under an argon atmosphere, a flask having a condenser was filled with 300 ml of diethyleneglycol. The solvent was degassed under vacuum, then placed under argon. 10 ml of titanium tetrachloride was added, followed by 5 ml of distilled water. The flask was heated at 160° C. for 3.5 hours. After cooling to room temperature, the solution was slowly poured into acetone placed in an Erlenmeyer flask, while stirring. A white precipitate was immediately formed. The precipitate was isolated by centrifugation (3000 rpm for 5 minutes) and washed twice with acetone, which was removed by centrifugation. The solid was dried under vacuum. The particles were dispersible in water, giving a clear solution with no white precipitate. The particle size, measured using a Malvern sizer, was 16 nm.

A printing ink was prepared by dispersing 330 mg of the nanoparticles in 5 ml distilled water. The clear solution was filtered for any dust impurities using a 0.2 micron filter. The ink was then printed using a Dimatix inkjet printer in which the cartridge was filled with the invisible ink.

Example 1

A one dimensional UPC barcode was printed as described above. The barcode was invisible under normal light and under black light. However, the barcode became visible upon exposure to 254 nm light. The barcode was successfully read by a scanner and the processor correctly provided the correct decoded information.

Example 2

A data glyph pattern was printed with the ink in the same manner as described above. The data glyphs were invisible under normal light and under black light. However, the glyphs became visible upon exposure to 254 nm light.

Example 3

A pattern of dots encoding information was printed with the ink in the same manner as described above. The dots were invisible under normal light and under black light. However, the dots became visible upon exposure to 254 nm light.

Example 4

Colored paper substrates were printed with a dot pattern using the ink, as in Example 3 above. The dots were invisible under normal light and under black light. However, the dots became visible upon exposure to 254 nm light. The contrast between the printed and blank areas was lower when compared with white paper, but was still detectable in all cases under 254 nm light. Yellow, blue, green and red Xerox papers were successfully printed with encoded information that was able to be subsequently read and decoded.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A document, comprising:

a paper substrate having an average surface roughness of at least about 0.5 microns, and selected from the group consisting of white paper that includes one or more optical brighteners and paper having a color other than white, wherein the paper substrate includes encoded information printed thereon, wherein the encoded information is printed with an ink comprised of light absorbing material that absorbs light only at wavelengths below 350 nm, and wherein the light absorbing material that absorbs light only at wavelengths below 350 nm is not colored and the ink is not fluorescent and does not emit any color when irradiated with light at wavelengths below 350 nm, and wherein the light absorbing material comprises nanoparticles having an average particle size of 300 nm or less selected from the group consisting of zinc oxide, silica, alumina, titania and mixtures thereof, or comprises an organic material selected from the group consisting of hydroxybenzophenones, hydroxybenzotriazoles, oxanilides, triazines, and mixtures thereof.

2. The document according to claim 1, wherein the light absorbing material absorbs light only at wavelengths below 260 nm.

3. The document according to claim 1, wherein the encoded information is in a form selected from the group consisting of one-dimensional barcode, two-dimensional barcode, data glyphs, dots and combinations thereof.

4. The document according to claim 1, wherein the ink further comprises a clear binder comprising polymethyl methacrylate, polystyrene, polyethylene, polycarbonates, polysulfones, polyethersulfones, polyarylsulfones, polyarylethers, polyvinyl derivatives, cellulose derivatives, polyurethanes, polyamides, polyimides, polyesters, silicone resins, epoxy resins or mixtures thereof, and a solvent.

5. The document according to claim 1, wherein the paper substrate further includes at least one image thereon that is visible to a naked human eye under light having wavelengths of 365 nm or more.

6. The document according to claim 1, wherein the paper substrate is substantially white paper that includes one or more optical brighteners.

7. The document according to claim 6, wherein the one or more optical brighteners in the paper emit light in response to exposure to light having wavelengths in a range of from about 100 nm to about 800 nm.

8. The document according to claim 1, wherein the paper substrate is paper having a color other than white.

9. The document according to claim 1, wherein the paper substrate has an average surface roughness of from about 1 micron to about 20 microns.

10. The document according to claim 1, wherein the paper substrate has an average porosity of from about 100 to about 2,000 milliliters per minute.

11. The document according to claim 1, wherein the paper substrate is substantially free of any gloss surface coating thereon.

12. The document according to claim 1, wherein the ink is printed as a liquid and penetrates into the paper substrate.

13. A method of forming a document including encoded information on a paper substrate, wherein the encoded information is substantially not detectable to a naked human eye through differential gloss or exposure to light having wavelengths of 365 nm or more, the method comprising providing a paper substrate having an average surface roughness of at least about 0.5 microns, and selected from the group consisting of substantially white paper that includes one or more optical brighteners and paper having a color other than white, and printing the encoded information on the paper substrate with an ink comprised of clear binder and light absorbing material that absorbs light only at wavelengths below 350 nm, wherein the light absorbing material that absorbs light only at wavelengths below 350 nm is not colored and the ink is not fluorescent and does not emit any color when irradiated with light at wavelengths below 350 nm, and wherein the light absorbing material comprises nanoparticles having an average particle size of 300 nm or less selected from the group consisting of zinc oxide, silica, alumina, titania and mixtures thereof, or comprises an organic material selected from the group consisting of hydroxybenzophenones, hydroxybenzotriazoles, oxanilides, triazines, and mixtures thereof.

14. The method according to claim 13, wherein the encoded information is printed in a form selected from the group consisting of one-dimensional barcode, two-dimensional barcode, data glyphs, dots and combinations thereof.

15. The method according to claim 13, wherein the ink penetrates into the paper substrate prior to curing or drying of the ink.

16. The method according to claim 13, wherein the method further comprises exposing the printed document to light having a wavelength of less than 350 nm and at which the light absorbing material absorbs the light, thereby revealing the encoded information to the naked human eye and permitting reading and decoding of the encoded information.

17. A document, comprising:

a paper substrate having an average surface roughness of at least about 0.5 microns, wherein the paper substrate includes encoded information printed thereon, wherein the encoded information is printed with an ink comprised of light absorbing material that absorbs light only at wavelengths below 350 nm, and wherein the light absorbing material that absorbs light only at wavelengths below 350 nm is not colored and the ink is not fluorescent, wherein the encoded information becomes readable upon exposure to light having a wavelength below 350 rim only as a result of the light absorbing material absorbing the light having a wavelength below 350 nm and thereby creating a readable contrast differential between the encoded information and the paper substrate, and wherein the light absorbing material comprises nanoparticles having an average particle size of 300 nm or less selected from the group consisting of zinc oxide, silica, alumina, titania and mixtures thereof, or comprises an organic material selected from the group consisting of hydroxybenzophenones, hydroxybenzotriazoles, oxanilides, triazines, and mixtures thereof.

18. The document according to claim 17, wherein the paper substrate is selected from the group consisting of white paper that includes one or more optical brighteners and paper having a color other than white.

* * * * *